United States Patent
Wang et al.

(10) Patent No.: US 7,864,833 B2
(45) Date of Patent: Jan. 4, 2011

(54) METHOD FOR MEASURING INTERFERENCE POWER IN TIME-SLOT CDMA SYSTEM

(75) Inventors: Yingmin Wang, Beijing (CN); Shaoli Kang, Beijing (CN); Jinling Hu, Beijing (CN)

(73) Assignee: Da Tang Mobile Communications Co., Ltd., Beijing (CN)

( * ) Notice: Subject to any disclaimer, the term of this patent is extended or adjusted under 35 U.S.C. 154(b) by 810 days.

(21) Appl. No.: 10/561,094

(22) PCT Filed: Jul. 28, 2004

(86) PCT No.: PCT/CN2004/000877

§ 371 (c)(1),
(2), (4) Date: Oct. 25, 2006

(87) PCT Pub. No.: WO2005/013508

PCT Pub. Date: Feb. 10, 2005

(65) Prior Publication Data

US 2007/0201538 A1    Aug. 30, 2007

(30) Foreign Application Priority Data

Aug. 5, 2003    (CN) ................... 03 1 49766

(51) Int. Cl.
*H04B 1/00* (2006.01)
(52) U.S. Cl. .................. 375/144; 375/148
(58) Field of Classification Search .......... 375/140, 375/144, 350
See application file for complete search history.

(56) References Cited

U.S. PATENT DOCUMENTS

| | | | |
|---|---|---|---|
| 6,477,161 B1 | 11/2002 | Hudson et al. | |
| 6,816,470 B2 * | 11/2004 | Kim et al. | 370/280 |
| 7,372,825 B1 * | 5/2008 | Schmidl et al. | 370/328 |
| 2003/0072277 A1 | 4/2003 | Subrahmanya et al. | |

FOREIGN PATENT DOCUMENTS

| | | |
|---|---|---|
| DE | 199 52 949 A1 | 5/2001 |
| JP | 10-190522 | 7/1998 |

* cited by examiner

*Primary Examiner*—Shuwang Liu
*Assistant Examiner*—David Huang
(74) *Attorney, Agent, or Firm*—Merchant & Gould P.C.

(57) ABSTRACT

The present invention relates to a method for measuring interference power in a time slot CDMA system, The method includes: performing channel estimation for received signals with channel estimation codes, to obtain the original channel response estimation results $h_i$, i=1 ... P; predetermining a threshold of number of taps $W_1$, and selecting the channel response estimation results for $W_1$ taps with less power from the original channel response estimation results $h_i$ for $W_1$ as the roughly estimated result of the interference power; performing threshold processing on the original channel response estimation results by post-processing against signal-to-noise ratio threshold, by using the roughly estimated result of the interference power and the predetermined signal-to-noise ratio threshold, before processing compensating the possible error generated from rough estimation of the interference power and performing threshold processing with the compensated power threshold, so as to ultimately obtain an accurate measured result of the interference power.

7 Claims, 1 Drawing Sheet

METHOD FOR MEASURING INTERFERENCE POWER IN TIME-SLOT CDMA SYSTEM

FIELD OF THE INVENTION

The present invention relates to mobile communication technical field, and more particularly to a method for measuring interference signal power in a time slot CDMA system.

BACKGROUND OF THE INVENTION

In a 3GPP (Third Generation Partnership Project) TDD (Time Division Duplex) system, a receiver utilizes channel estimation codes (midamble codes) and responses to channel estimation codes from channel estimation windows to measure the Interference Signal Code Power (ISCP). A response result from the channel estimation windows includes taps with signal response components and taps without signal response components; wherein, the tap without signal response component represents a response to the interference and is referred as an interference response tap. The interference signal power (or referred as interference signal code power) can be obtained through measurement and statistic of these interference response taps.

In practical applications, usually either of the following two methods is used to obtain the interference response and the ISCP:

The first method is used to measure the interference power by using idle channel estimation windows. During the channel estimation, each of the channel estimation codes obtained by shifting the basic midamble codes corresponds to each channel estimation window. The total length of the channel estimation windows P remains constant (e.g., P=128). In a time slot, if one or more channel estimation codes are not used to send signals, then the channel estimation window(s) corresponding to the channel estimation code(s) is referred as idle channel estimation window(s). In the original channel response results, the idle channel estimation windows correspond to responses to interference signals. The interference power $\sigma_n^2$ can be measured with these responses from the idle channel estimation windows:

$$\sigma_n^2 = \frac{P}{D \cdot W} \frac{1}{\left(\begin{array}{c}\text{\# of all } k_m \\ \text{not used}\end{array}\right)} \sum_{\substack{\text{all } k_m \\ \text{not used}}} \sum_{i=0}^{W-1} |\underline{h}_i^{(k_m)}| \quad (1)$$

wherein, W represents the length of a channel estimation window. First, the total power of window $k_m$ (sum of W tap powers) is calculated with the channel estimation result $h_i^{(k_m)}$; then, the total power of all idle channel estimation windows (sum of total powers of all idle channel estimation windows) is obtained (wherein, $k_m$ represents a specific idle window (all $k_m$ not used)); next, the average of all taps from all idle channel estimation windows, i.e., the interference power, is obtained by multiplying the resulting value by P and then dividing by D and W and the number of all idle channel estimation windows (# of all $k_m$ not used). Wherein D is the noise degradation factor and greater than 1, corresponding to the basic midamble codes (a complex value sequence $m_i$, i=1 . . . P), and can be obtained with the following equation:

$$D = \sum_{l=1}^{P} \left| \frac{1}{\frac{1}{P}\sum_{i=1}^{P} m_i e^{-j2\pi li/P}} \right|^2 > 1 \quad (2)$$

Performing interference power estimation with the method expressed by equations (1) and (2) has an advantage in performance; however, the premise is: idle channel estimation windows are required and the positions of the idle channel estimation windows must be available. The idle channel estimation windows usually exist; however, there are difficulties in obtaining positions of the idle channel estimation windows:

For uplinks, since the channel estimation windows are assigned by a base station, the base station knows the positions of the idle channel estimation windows; therefore, the above method is advantageous in estimation of interference power for uplinks;

However, for downlinks, a user terminal can obtain the positions of estimation windows in any of the following three ways:
1) defining a special channel estimation window in each time slot and keeping it in idle status permanently or at a position of a certain frame cycle;
2) sending the idle channel estimation window information to the user terminals by base station broadcasting or signaling;
3) for the active time slot, keeping the channel estimation window of the user in idle status in a specific frame.

The above method of obtaining idle channel estimation window information for downlinks will cause waste of system resource, complexity in implementation, and real-time performance. Viewed from the current situation, it is impossible for the existing mobile communication standards to support user terminals to obtain idle channel estimation window information; therefore, for user terminal applications, it is impossible to perform measurement of interference power with the idle channel estimation window method.

The second method is used to perform measurement of interference power by post-processing against SNR (Signal-to-noise Ratio) threshold. Treating the channel response estimation result against SNR threshold can separate signal response from interference response. In detail, the post-processing against SNR threshold includes: determining whether the SNR of each tap in the original channel estimation result is higher than a specific threshold; if it is higher than the specific threshold, the channel estimation value at the tap is deemed as the signal response; if it is lower than the specific threshold, the channel estimation value at the tap is deemed as the interference response. Suppose the specific SNR threshold is $\epsilon_{CHE}$ and the reference threshold of interference power is $\sigma_n^2$, then the corresponding power threshold is:

$$\Gamma_{CHE} = \sigma_n^2 \epsilon_{CHE}/P \quad (3)$$

After post-processing, the interference response is:

$$\underline{h}_i'' = \begin{cases} \underline{h}_i; & \|\underline{h}_i\|^2 < \Gamma_{CHE}, i = 1 \ldots P \\ 0; & \text{else} \end{cases} \quad (4)$$

The above equation indicates: if the channel response is lower than the interference power threshold, it is kept; otherwise it is discarded (i.e., zero). Suppose the number of taps of interference response after post-processing is $W_n$, then the interference power $\sigma_n^2$ can be calculated with the following equation:

$$\sigma_n^2 = \frac{P}{D \cdot W_n} \sum_{i=1}^{P} |h_i''|^2 \quad (5)$$

Wherein, D is the noise degradation factor of corresponding basic midamble code and is calculated with equation (2).

Performing estimation of interference power with this method has an advantage in performance; however, the premise is: the reference threshold of interference power, i.e., $\sigma_n^2$ in equation (3), must be available; but what is solved in equation (5) is just the interference power $\sigma_n^2$. If the priori value is unavailable or the error of the priori value is high, performing estimation of interference power with the method makes no sense. Therefore, in actual measurement of interference power, the method can't be used separately, unless it is used in a situation without idle channel estimation windows in conjunction with the idle channel estimation window method.

In conclusion, in 3GPP TDD systems, the existing ISCP measuring methods can't meet the requirements in downlink terminal applications. However, for normal system operation, it is required that the user terminals can measure the ISCP in active time slots and non-active time slots in downlinks; therefore, an effective method for measuring ISCP of user terminals in downlinks is required.

SUMMARY OF THE INVENTION

An object of the present invention is to provide a method for measuring interference power in a time slot CDMA (Code Division Multiple Access) system, to enable user terminals to perform measurement of interference signal code power, including measurement of interference signal code power in active time slots and non-active time slots in downlinks.

The object of the present invention is attained with the following technical solution: a method for measuring interference power in a time slot CDMA system, including:

A performing channel estimation for received signals with channel estimation codes, to obtain the original channel response estimation results $h_i$, i=1 ... P, wherein P is the total length of the channel estimation window; wherein the method further includes:

B. predetermining a threshold of number of taps $W_1$, and selecting channel response estimation results corresponding to $W_1$ taps with less power from the original channel response estimation results $h_i$ according to the threshold of number of taps $W_1$ as a roughly estimated result of the interference power;

C. performing threshold processing on the original channel response estimation results with a signal-to-noise ratio threshold post-processing method by using the roughly estimated result of the interference power and a predetermined signal-to-noise ratio threshold, to obtain an accurate measured result of the interference power.

The method for measuring interference power according to the present invention mainly includes two steps of: performing rough estimation for the interference power; and then obtaining the accurate estimated result of the interference power with the roughly estimated result of interference power. Since the rough estimation is performed by selection of the taps according to the predetermined threshold of number of taps and the accurate estimation is performed by processing according to the SNR threshold and the obtained roughly estimated result of interference power, it is unnecessary to know the positions of idle channel estimation windows or depend on a priori value of reference threshold of interference power to obtain the accurate measured value of the interference power by two steps of processing.

Moreover, in the accurate measurement of interference power, the present invention makes some compensation for the possible error in rough estimation of interference power, i.e., a compensated power threshold is obtained according to the predetermined SNR threshold; and performs threshold processing on the original channel estimation results by using the power threshold so as to obtain the interference signal response; and then estimates the ISCP with the interference signal response.

The method according to the present invention can be used for measurement of interference power in a time slot CDMA mobile communication system. With the method, the ISCP in downlinks in a time slot CDMA mobile communication system can be measured reliably, without the need to know the positions of idle channel estimation windows or depend on a priori value of reference threshold of interference power. Therefore, the method according to the present invention is especially applicable for measurement of interference power in downlinks in a time slot CDMA system; of course, viewed from the nature of the method, it is also applicable for measurement of interference power in uplinks in a time slot CDMA system.

DETAILED DESCRIPTION OF THE EMBODIMENT

Figure 1:
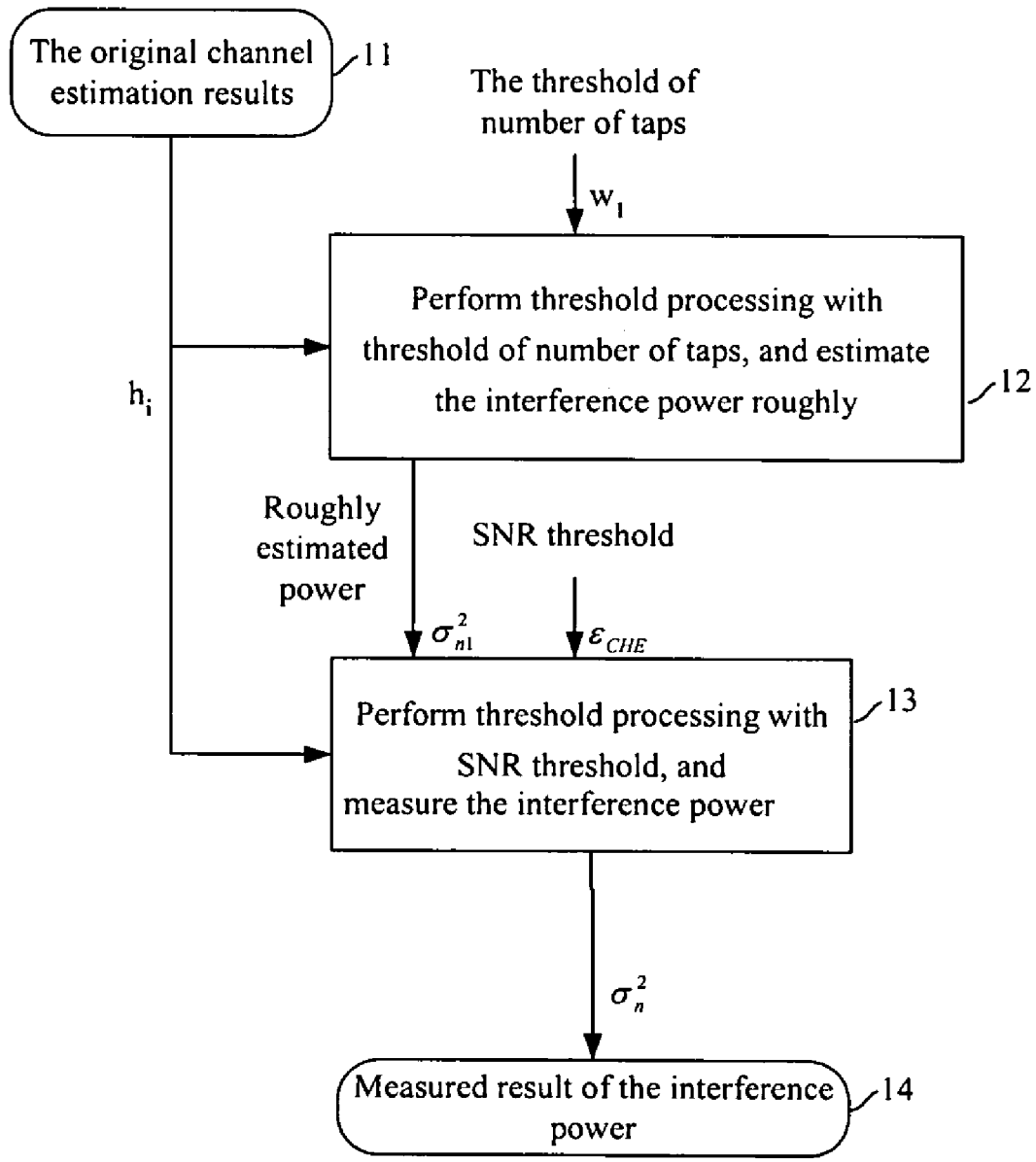
FIG. 1 is a flow diagram of the method for measuring interference signal code power according to an embodiment of the present invention.

Hereunder the present invention will be described in detail with reference to the attached drawings.

It is provided a method for measuring interference power in a time slot CDMA mobile communication system, especially in user terminal applications. In the embodiment, the method for measuring interference power in user terminals in 3GPP TDD systems is further described.

As shown in FIG. 1, the method for measuring interference signal code power according to the present invention is performed from rough estimation to accurate estimation:

step 11. perform channel estimation for received signals with channel estimation codes, to obtain channel response results of all users in the current cell, i.e., the original channel estimation results $h_i$;

step 12. process the original channel estimation results $h_i$, according to the predetermined threshold of number of taps $W_1$, to obtain a roughly estimated result of an interference signal power.

In particular, the rough estimation of interference power with $W_1$ taps of the interference responses is as follows: select $W_1$ taps with less power from all the original channel estimation results $h_i$ according to the predetermined threshold of number of taps $W_1$ (the $W_1$ taps with less power may be selected starting from a tap with the weakest power and in the order of the weakest one, the secondary weak one, ..., till $W_1$ taps are selected; or, they may be selected in other orders), keep the channel estimation results $h_i$ corresponding to the $W_1$ taps as the roughly estimated interference response results $h'_i$ of interference signal power, and discard the rest taps, as given by equation (6):

$$h'_i = \begin{cases} h_i & W_1 \text{ taps with less power} \\ 0; & \text{else} \end{cases}, i = 1 \ldots P. \quad (6)$$

Wherein, the threshold of number of taps $W_1$ shall be less than the number of taps of the actual interference responses available. Alternatively, the threshold of number of taps $W_1$ may also be predetermined according to channel environment and system configuration. The threshold of number of taps $W_1$ may be in a range of 50 to 90; in this embodiment, the threshold of number of taps $W_1$ is 8.

Next, the roughly estimated result of interference power $\sigma_{n1}^2$ is obtained with the interference response results $h'_i$ and given by equation (7):

$$\sigma_{n1}^2 = \frac{P}{D \cdot W_n} \sum_{i=1}^{P} |h'_i|^2 \quad (7)$$

Equation (7) is similar to equation (5), with the difference that the number of taps $W_n$ is replaced with $W_1$ and $\sigma_n^2$ is replaced with $\sigma_{n1}^2$. For a 3GPP TDD system, the cycle of channel estimation codes (total window length) P is 128.

Step 13: process the original channel estimation results $h_i$ according to the SNR threshold $\epsilon_{CHE}$ by using the roughly estimated value of interference power $\sigma_{n1}^2$ and the predetermined SNR threshold $\epsilon_{CHE}$, to obtain the accurate measured value of interference power. Since the SNR threshold method is used in this step, a SNR threshold $\epsilon_{CHE}$ has to be predetermined, and a reference threshold of interference power has to be provided. Due to the fact that the roughly estimated interference power in the previous step is usually lower than the actual interference power and the error varies as the environment and system operation status, a certain compensation for the possible error is made in this step, so as to ensure the result obtained from processing according to the SNR threshold covers major components of the interference power. In the embodiment of the present invention, the resulting value obtained from the roughly estimated power $\sigma_{n1}^2$ after compensation is taken as the reference threshold of interference power, and then the accurate measured result of interference power is obtained by processing according to the predetermined SNR threshold $\epsilon_{CHE}$.

Due to the fact that the result obtained in step 12 is the roughly estimated result of interference power obtained with taps of noise responses, a certain compensation for the possible error in the result is necessary. After compensation, the power threshold shall be:

$$\Gamma_{CHE} = \frac{\sigma_{n1}^2 \varepsilon_{CHE}}{P\beta} \quad (8)$$

Wherein, the SNR threshold $\epsilon_{CHE}$ is usually predetermined in a range of 3 to 5, and, in this embodiment, it is determined as $\epsilon_{CHE}=4$; $\beta$ is the compensation factor provided in consideration that the roughly estimated interference power may be lower than the actual value; $\beta$ is usually in a range of 0.30 to 0.60, and is determined as $\beta=0.41$ in this embodiment.

The interference response $h''_i$ obtained by the processing according to the SNR threshold with the compensated threshold of interference power $\Gamma_{CHE}$ is:

$$h''_i = \begin{cases} h_i; & \|h_i\|^2 < \Gamma_{CHE}, i = 1 \ldots P. \\ 0; & \text{else} \end{cases} \quad (9)$$

Equation (9) is similar to equation (4); wherein, the channel responses less than the threshold of interference power $\Gamma_{CHE}$ are kept, while other channel responses are discarded (i.e., zero). The only difference between them is that: after the processing according to the SNR threshold, the number of taps corresponding to the interference responses $h_i$ is $W_2$. The interference power can be calculated with the following equation:

$$\sigma_n^2 = \frac{P}{D \cdot W} \sum_{i=1}^{P} |h''_i|^2 \quad (10)$$

Equation (10) is identical to equation (5). In this way, via two steps of processing, the accurate measured value of interference power $\sigma_n^2$ is obtained.

The method for measuring interference power according to the present invention is applicable to time slot CDMA mobile communication systems, especially applications of receiving devices in down links. It can be used to measure the interference power in time slot CDMA mobile communication systems reliably and accurately when the information of idle channel estimation windows is unavailable.

The invention claimed is:

1. A method for measuring interference power in a time slot code division multiple access system, comprising:
   A. performing channel estimation for received signals with channel estimation codes, to obtain channel response results of all possible user terminals in the current cell, i.e., the original channel response estimation results $h_i$, i=1 . . . P, wherein P is the total length of channel estimation windows;
   B. predetermining a threshold of number of taps $W_1$, and selecting channel response estimation results corresponding to $W_1$ taps with less power from the original channel response estimation results $h_i$ according to the threshold of number of taps $W_1$ as a roughly estimated result of the interference power; and
   C. performing threshold processing on the original channel response estimation results with a signal-to-noise ratio threshold post-processing method by using the roughly estimated result of the interference power and a predetermined signal-to-noise ratio threshold, to obtain an accurate measured result of the interference power;
   wherein said threshold of number of taps $W_1$ is in a range of 50 to 90.

2. A method for measuring interference power in a time slot code division multiple access system according to claim 1, wherein said threshold of number of taps $W_1$ is less than the number of taps of the actual interference responses available.

3. A method for measuring interference power in a time slot code division multiple access system according to claim 1, wherein said threshold of number of taps $W_1$ is 80.

4. A method for measuring interference power in a time slot code division multiple access system according to claim 1, wherein in step B, the roughly estimated result of the interference power $\sigma_{n1}^2$ is obtained with equation $$\sigma_{n1}^2 = \frac{P}{D \cdot W} \sum_{i=1}^{P} |h'_i|^2,$$

wherein $h'_i$ is the channel response estimation results for $W_1$ taps, and D is the noise degradation factor of the corresponding channel estimation code.

5. A method for measuring interference power in a time slot code division multiple access system according to claim 1, wherein step C of performing threshold processing on the original channel response estimation results with the signal-to-noise ratio threshold post-processing method further comprises:

C1. obtaining a compensated threshold of the interference power $\Gamma_{CHE}$ with equation $$\Gamma_{CHE} = \frac{\sigma_{n1}^2 \varepsilon_{CHE}}{P\beta}$$

according to the predetermined signal-to-noise ratio threshold $\epsilon_{CHE}$, the compensation value $\beta$, and the roughly estimated result of the interference power $\sigma_{n1}^2$;

C2. selecting channel response estimation results corresponding to $W_2$ taps with the power lower than the threshold of the interference power $\Gamma_{CHE}$ from the original channel response estimation results as the interference response results $h''_i$ of the signal-to-noise ratio threshold post-processing;

C3. obtaining the accurate measured value of the interference power with equation $$\sigma_n^2 = \frac{P}{D \cdot W_2} \sum_{i=1}^{P} |\underline{h}''_i|^2,$$

wherein D is the noise degradation factor of the corresponding channel estimation code.

6. A method for measuring interference power in a time slot code division multiple access system according to claim 5, wherein said signal-to-noise ratio threshold $\epsilon_{CHE}$ is in a range of 3 to 5, and wherein said compensation value $\beta$ is provided for the lower roughly estimated result of the interference power and is in a range of 0.30 to 0.60.

7. A method for measuring interference power in a time slot code division multiple access system according to claim 6, wherein said signal-to-noise ratio threshold $\epsilon_{CHE}$ is 4, and said compensation value $\beta$ is 0.41.

* * * * *